United States Patent
Berkey et al.

(10) Patent No.: US 8,843,979 B2
(45) Date of Patent: *Sep. 23, 2014

(54) PREDICTIVE FRAME DROPPING TO ENHANCE QUALITY OF SERVICE IN STREAMING DATA

(71) Applicant: Sony Computer Entertainment Inc., Tokyo (JP)

(72) Inventors: Howard Berkey, Oakland, CA (US); Payton R. White, Foster City, CA (US); James E. Marr, Burlingame, CA (US); Stephen Detwiler, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,953

(22) Filed: Oct. 19, 2012

(65) Prior Publication Data

US 2013/0212632 A1 Aug. 15, 2013

Related U.S. Application Data

(63) Continuation of application No. 11/425,871, filed on Jun. 22, 2006, now Pat. No. 8,296,813.

(51) Int. Cl.
*H04N 21/24* (2011.01)
*H04L 12/801* (2013.01)
*H04L 12/823* (2013.01)
*H04L 29/06* (2006.01)

(52) U.S. Cl.
CPC ............. *H04L 47/19* (2013.01); *H04L 47/29* (2013.01); *H04L 47/32* (2013.01); *H04L 65/602* (2013.01); *H04N 21/2402* (2013.01)
USPC ............................................ 725/96; 370/230

(58) Field of Classification Search
USPC ...................................... 725/96; 370/229–234
See application file for complete search history.

(56) References Cited

U.S. PATENT DOCUMENTS

| 8,296,813 B2 | 10/2012 | Berkey et al. |
| 8,345,740 B2 | 1/2013 | Van Der Stok et al. |
| 2007/0201500 A1 | 8/2007 | Deshpande |
| 2008/0137728 A1 | 6/2008 | Van Der Stok et al. |

FOREIGN PATENT DOCUMENTS

WO 2006075302 A 7/2006

OTHER PUBLICATIONS

Notification of Reasons for Refusal. Dispatched Sep. 7, 2011 for Japanese Patent Application 2009-516625.
Sergei Kozlov et al, "Adaptive scheduling of MPEG video frames during real-time wireless video streaming", Proceedings of Sixth IEEE International Symposium on a World of Wireless Mobile and Multimedia Networks D ( WoWMoM 2005), 2005.
Ricardo N. Vaz and Mario S. Nunes, "Selective Frame Discard for Video Streaming over IP Networks", Proceedings of the 7th Conference on Computer Networks (CRC2004, Oct. 2004).

(Continued)

*Primary Examiner* — Bennett Ingvoldstad
(74) *Attorney, Agent, or Firm* — Joshua D. Isenberg; JDI Patent

(57) ABSTRACT

Methods and apparatus for optimizing quality of streaming data transmitted between a first node and a second node over a network, the streaming data including one or more frame groups is disclosed. A processor-readable medium having embodied therein processor readably instructions for implementing a method for optimizing quality of streaming data transmitted between a first node and a second node over a network is also disclosed.

26 Claims, 5 Drawing Sheets

(56) References Cited

OTHER PUBLICATIONS

Notice of Preliminary Rejection from the Korean Intellectual Property Office issued on Jun. 21, 2010 with regards, to the Korean PCT Patent Application No. 10-2008-7031097.

Kozlov, Sergei et al. "Adaptive Scheduling of MPEG Video Frames During Real-Time Wireless Video Streaming" Proceedings of the sixth IEEE International Symposium on a World of Wireless Mobile and Multimedia Networks 2005, pp. 1-3.

International Search Report and Written Opinion from the International Searching Authority dated Sep. 10, 2008 for International Application No. PCT/US07/70275, 8 pages.

Notification of Reasons for Refusal. Dispatched Jun. 7, 2011 for Japanese Patent Application 2009-516625.

"Network-Adaptive High Definition MPEG-2 Streaming over IEEE 802.11a WLAN using Frame-based Prioritized Packetization."

"Park, Sanghoon et. al. WMASH'05 Sep. 2, 2005, Cologne, Germany.

"Active Router Approach for Selective Packet Discard of Streamed MPEG video under Low Bandwidth Conditions." Ravindra G,N Balakrishnan, K R Ramakrishnan. 2000 IEEE.

Vaz, Ricard N. et al. "Selective Frame Discard for Video Streaming over IP Networks", CRC2004.

Non-Final Office Action of Aug. 20, 2008 in U.S. Appl. No. 11/425,871, filed Jun. 22, 2006.

Non-Final Office Action of Feb. 5, 2009 in U.S. Appl. No. 11/425,871, filed Jun. 22, 2006.

Non-Final Office Action of Jul. 30, 2009 in U.S. Appl. No. 11/425,871, filed Jun. 22, 2006.

Final Office Action of Feb. 18, 2010 in U.S. Appl. No. 11/425,871, filed Jun. 22, 2006.

Extended European Search Report for EP Application No. 07798037.3, dated Apr. 17, 2014.

PREDICTIVE FRAME DROPPING TO ENHANCE QUALITY OF SERVICE IN STREAMING DATA

CLAIM OF PRIORITY

This application is a continuation of and claims the priority benefit of commonly-assigned, co-pending U.S. patent application Ser. No. 11/425,871 entitled "PREDICTIVE FRAME DROPPING TO ENHANCE QUALITY OF SERVICE IN STREAMING DATA" to Howard Berkey, Payton R. White, James E. Marr, and Stephen Detwiler, filed Jun. 22, 2006, the entire disclosures of which are incorporated herein by reference.

FIELD OF THE INVENTION

Embodiments of the present invention are directed to Quality of Service (QoS) in streaming data and more particularly to predictive frame dropping to maximize the quality of a data stream while adhering to bandwidth limitations.

BACKGROUND OF THE INVENTION

Streaming data applications use various means to adapt to bandwidth limitations. For certain applications, such as real-time streaming video, however, there are fewer options due to the real-time constraints on the system. For real-time streaming video applications, a Quality of Service (QoS) software module may be implemented that limits the bandwidth available to the video stream. Often this bandwidth must be shared with other parts of the system that are also managed by the QoS module. If the QoS module cannot change other attributes of the video stream (such as quality or bit rate), as may happen if the stream is encoded once for several recipients of differing bandwidth capability, this type of bandwidth limitation will likely cause the video stream transmission rate to be slowed down when the limit is reached. However, since the video data is time-sensitive, video frames that arrive late at the receiver may be dropped.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1A:
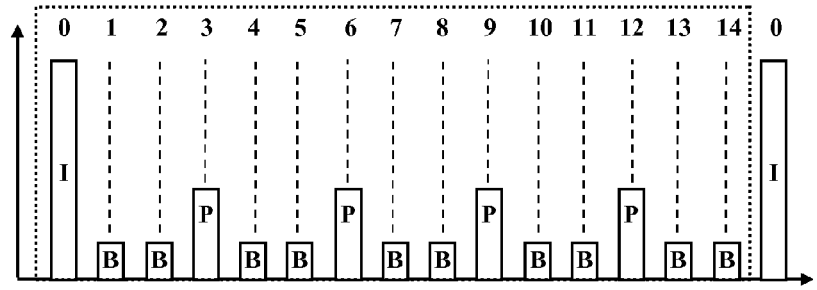
FIG. 1A is a schematic timing diagram illustrating transmission of a group of pictures (GoP).

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention may be applied to any form of streaming data including, but not limited to, video data, audio data, gaming data and file transfer data. For the purpose of example, the following discussion addresses situations where the streaming data is in the form of streaming video data.

Modern video coder/decoders (codecs), such as MPEG2, MPEG4 and H.264 generally divide video frames into three basic types known as Intra-Frames, Predictive Frames and Bipredictive Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames.

P-frames require the prior decoding of some other picture(s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

A set of related streaming data frames is generally referred to herein as a "frame group". One example, among others of a frame group is known as a Group of Pictures (GoP) in the context of streaming video. A GoP may be defined as a repeating pattern of frame types beginning with an I-frame and continuing until the next I-frame. A larger GoP means fewer I-frames are required per unit time, and the resulting video stream requires less bandwidth. By way of example, as depicted in FIG. 1A, a GoP may have 15 frames arranged as set forth in Table I below.

TABLE I

| | Frame Number | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Frame Type | I | B | B | P | B | B | P | B | B | P | B | B | P | B | B |

In this GoP, the P-frames each reference the I-frame at frame number 0. The B-frames reference the immediately surrounding I- and/or P-frames. For example, the B-frames at frames 14 and 15 reference the P-frame at frame 13 and an I-frame at frame 0 in the next GoP. As can be seen from FIG. 1A the I-frames, P-frames and B-frames may be of different sizes and may require different amounts of network bandwidth for transmission.

Bandwidth limitations on the network transmitting the frames may limit the number of frames that can be transmitted per unit time. In a topology where one node is streaming content to many nodes, it is difficult to change the size of the GoP and/or the frame rate to accommodate per-node changes in bandwidth. The decoding and re-encoding involved in such changes would either require a large amount of processing power at the sending node or a potentially large transcoding server infrastructure. Thus, it is sometimes useful for the QoS module to drop frames on the sender side in order to accommodate bandwidth limitations. If the sender is falling behind because it has to slow down its transmission rate due to bandwidth limitations, it will simply fall farther and farther behind if it does not drop frames to compensate. Unfortunately, dropping frames to compensate for bandwidth limitations can adversely affect the quality of the video at the receiving end. On the receiver side, if a reference frame (e.g., an I-frame or P-frame) is dropped, due to being too late; all the frames that reference it are useless. If a P-frame is randomly dropped, transmitted B-frames that reference that P-frame will be useless to the receiver.

Figure 1B:
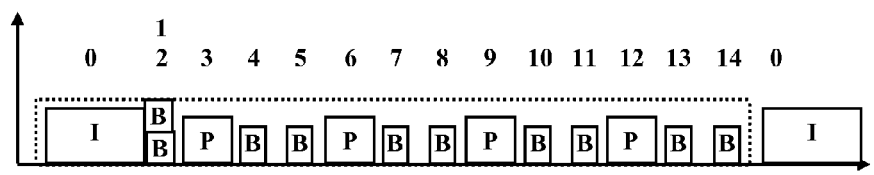
FIG. 1B is a schematic timing diagram illustrating transmission of a group of pictures using traffic shaping.

As shown in FIG. 1B, it is sometimes possible to transmit smaller frames, e.g., B-frames, in parallel. In the example depicted in FIG. 1B, B-frames 1 and 2 are transmitted in parallel. Similarly, the larger frames, e.g., I-frames or P-frames may be transmitted at a rate permitted by the network bandwidth but over a longer time. Such techniques are referred to herein as "traffic shaping". Although such techniques may be useful, their effectiveness may be limited if insufficient network bandwidth is available.

Embodiments of the invention implement predictive dropping of frames on the sending side of a streaming data transmission. According to embodiments of the present invention, quality of streaming data transmitted between a first node and a second node over a network may be optimized. The streaming data may include one or more frame groups. Each frame group may contain one or more frames including an intra frame (I-frame). A transmission queue containing one or more frames from a frame group is sequentially transmitted from the first node to the second node. When a new I-frame is queued for transmission any frames in the transmission queue that have not already been transmitted are dropped from the transmission queue, except for a currently transmitting I-frame.

Figure 2A:
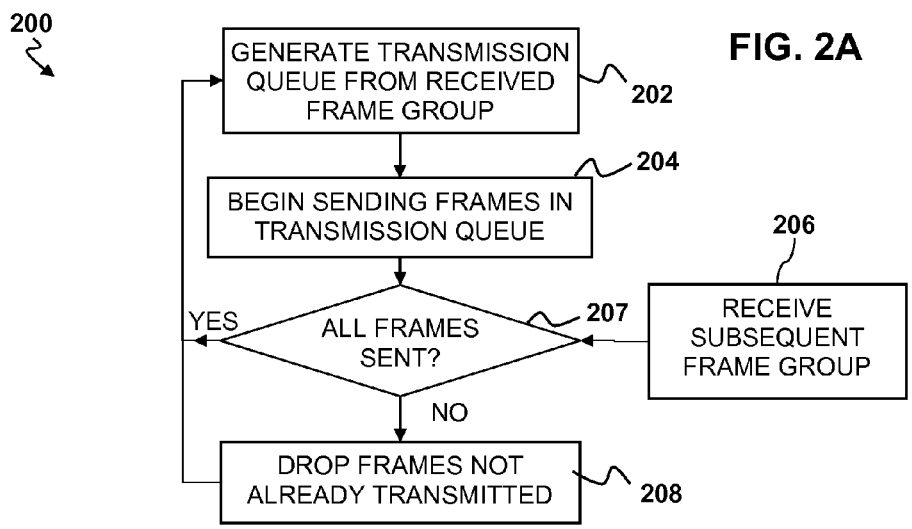
FIG. 2A is a flow diagram illustrating a method for optimizing quality of streaming data transmitted over a network according to an embodiment of the present invention.

A method 200 according to embodiments of the present invention may be implemented as depicted in the flow diagram of FIG. 2A. Specifically, at block 202 a transmission queue is generated from a received frame group. Transmission of frames from the transmission queue begins as indicated at block 204. At block 206 a subsequent frame group is received. This may occur while frames from the received frame group are still being transmitted. At block 207 it is determined whether all frames in the queue from the preceding frame group were sent. If so, the method returns to block 202 to generate a transmission queue for the subsequent frame group. If not, any frames not already transmitted are dropped from the current transmission queue (with the possible exception of a currently transmitting I-frame). The method then returns to block 202 to generate a transmission queue for the subsequent frame group.

Figure 2B:
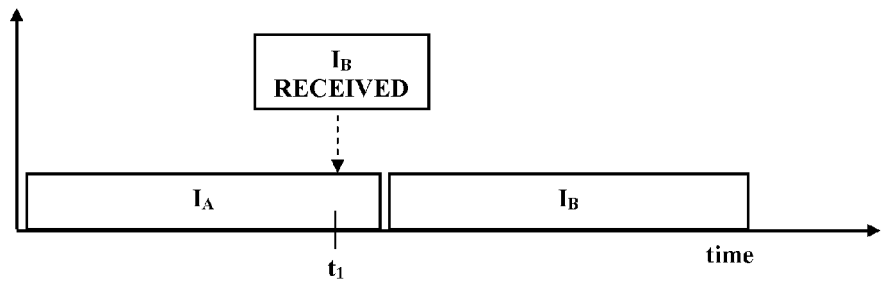
FIGS. 2B-2C are schematic timing diagrams illustrating transmission of frames of streaming data according to an embodiment of the present invention.
Figure 2C:
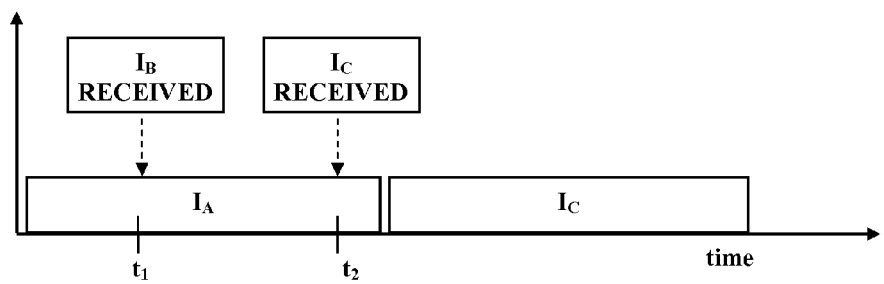

In some situations, bandwidth may be so limited that only I-frames can be transmitted. If an I-frame is queued for transmission, all other queued frames may be dropped (except for a currently transmitting I-frame, if one exists) so that the data stream does not fall behind, and the receiving side will receive frames it is capable of decoding. For example, as shown in the timing diagram in FIG. 2B, while a first I-frame $I_A$ is being transmitted a second I-frame $I_B$ is queued for transmission at time $t_1$. The second I-frame $I_B$ is transmitted after the first I-frame $I_A$ is finished transmitting. In some situations, network bandwidth may be so reduced as to prevent an I-frame from being transmitted. For example, as shown in FIG. 2C, it is possible that a third I-frame $I_C$ may be queued for transmission at time $t_2$ before the first I-frame $I_A$ is finished transmitting and after the second I-frame $I_B$ is queued at $t_1$. In such a case, the second I-frame $I_B$ may be dropped from the transmission queue since the third I-frame $I_C$ is more recent.

Figure 3:
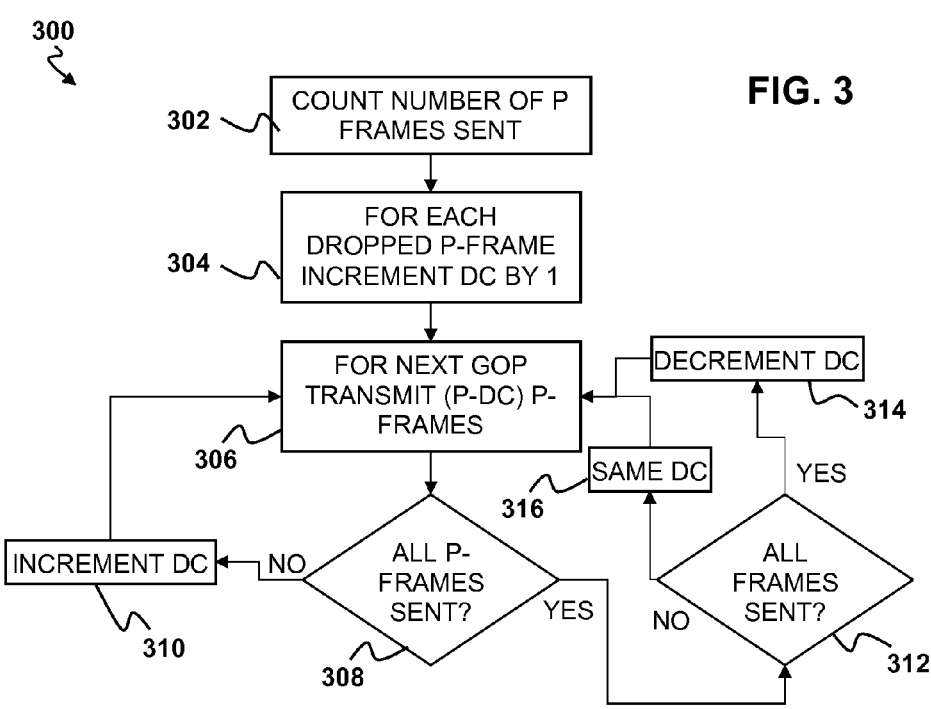
FIG. 3 is a flow diagram illustrating a method for optimizing quality of streaming data transmitted over a network according to an embodiment of the present invention.

In embodiments of the invention generating the transmission queue at block 202 of FIG. 2A may involve using the number and/or type of frames dropped from a transmission queue for one frame group to predictively determine how many and/or which frames to drop from a transmission queue for a subsequent frame group. The flow diagram of FIG. 3 illustrates an example of a method 300 that implements such predictive frame dropping that may be implemented as part of block 202 of FIG. 2A. The frame group may have an I-frame and a number P of P-frames. The number P of P-frames dropped from the transmission queue a previous frame group (e.g., a Group of Pictures (GoP) from a video data stream) due to the queuing of a new I-frame may be determined as indicated at block 302. This count may be added to a stored "drop counter" DC as indicated at block 304. A number of P-frames equal to the value of DC is then marked for dropping from the transmission queue for the subsequent frame group. Any B-frame that references a P-frame marked for dropping may be marked for dropping as well. Frames marked for dropping are discarded from the transmission queue and are not transmitted. A transmission queue containing the I-frame and (P-DC) P-frames from the subsequent frame group is then transmitted as indicated at block 306. Queuing of the next I-frame may interrupt the transmission as described above. Therefore, at block 308 it is determined whether all P-frames were sent. If not, the drop counter DC is incremented at block 310. By way of example, the drop counter may be decremented by any amount, e.g., by 1, up to a maximum value of P. If all P-frames were sent it is then determined whether all frames in the transmission queue (e.g., including any B-frames) were sent at block 312. If so, the drop counter DC may be decremented at block 314 by any amount, e.g., by 1, to a minimum value of zero. If not, the drop count stays the same at block 316. This process repeats for each frame group. In this manner, the drop counter value DC may automatically adjust for changes in bandwidth due to changes in network traffic conditions.

Figure 4A:
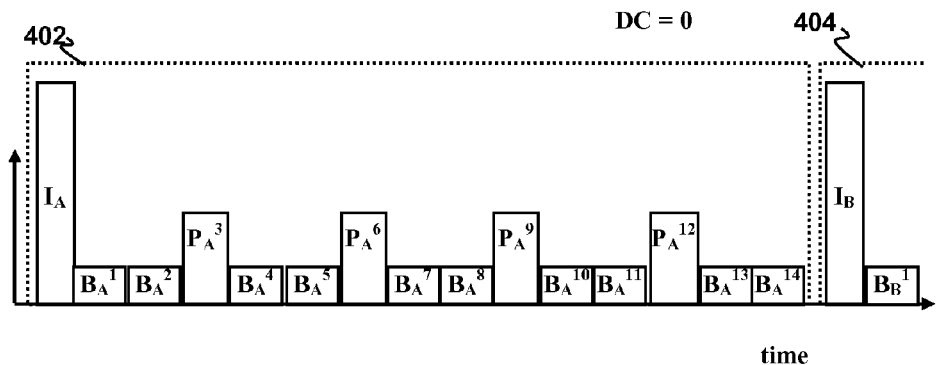
FIGS. 4A-4G are schematic timing diagrams illustrating optimization of quality of streaming data transmitted over a network according to an embodiment of the present invention.
Figure 4B:
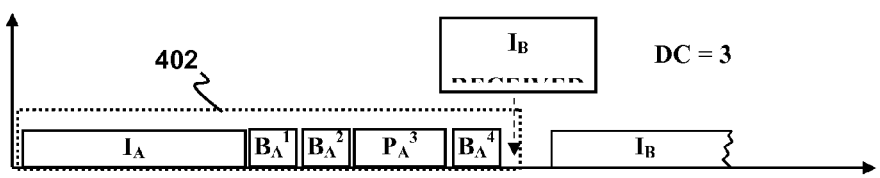
Figure 4C:
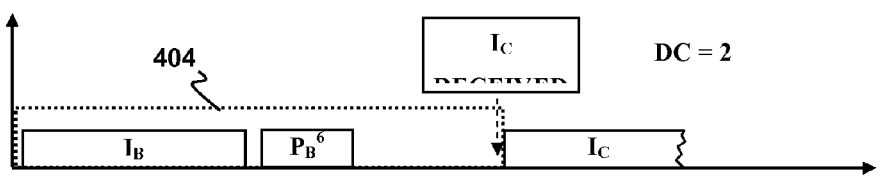

The timing diagrams in FIGS. 4A-4F illustrate examples of operation of the method described above with respect to FIG. 3. In these examples, the frames in each frame group are identified by a letter I, P or B indicating a frame type, a subscript identifying the frame group to which the frame belongs and a superscript identifying the location of the frame within the frame group. Specifically, FIG. 4A shows a transmission queue 402 for a frame group containing an I-frame $I_A^0$, P-frames $P_A^3$, $P_A^6$, $P_A^9$, and $P_A^{12}$ and B-frames $B_A^1$, $B_A^2$, $B_A^4$, $B_A^5$, $B_A^7$, $B_A^8$, $B_A^{10}$, $B_A^{11}$, $B_A^{13}$ and $B_A^{14}$. For this example, the drop counter DC is initially at zero. In this example, due to QoS bandwidth limits, only the I-frame $I_A^0$, P-frame $P_A^3$ and B-frames $B_A^1$, $B_A^3$ and $B_A^4$ are transmitted before I-frame $I_B^0$ starting the next frame group was queued as shown in FIG. 4B. This causes P-frames $P_A^6$, $P_A^9$, and $P_A^{12}$ and B-frames $B_A^5$, $B_A^7$, $B_A^8$, $B_A^{10}$, $B_A^{11}$, $B_A^{13}$ and $B_A^{14}$ to be dropped. Since three P-frames were dropped, the Drop Counter DC may be incremented from zero to three. Since the new frame group has started, three P-frames and the dependent B-frames may be marked for dropping. It is often desirable to substantially evenly distribute the dropped P-frames across the frame group. By way of example a resulting transmission queue 404 having substantially evenly distributed dropped P-frames may be as depicted in FIG. 4C. In this example P-frames closest to an I-frame may be preferentially dropped. In this case, only the I-frame $I_B^0$ and P-frame $P_B^6$ are sent in the transmission queue 404. In this example, the transmission queue 404 was successfully transmitted before the next I-frame $I_C$ was queued for transmission. As a result, the Drop Counter DC may be decremented to a value of 2.

Figure 4D:
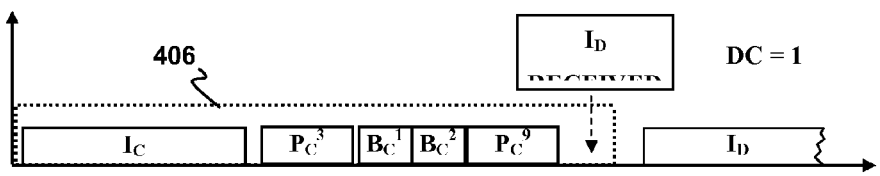

Since DC=2 only two P-frames are dropped from the transmission queue 406 for the next frame group. Again, it is desirable to evenly distribute the dropped frames across the frame group. For example, as shown in FIG. 4D, the transmission queue 406 may include the I-frame $I_C^0$, P-frames $P_C^3$, $P_C^9$ and B-frames $B_C^1$, $B_C^2$ (which reference I-frame $I_C^0$ and P-frame $P_C^3$). In this example, the entire transmission queue 406 is successfully transmitted before the I-frame $I_D^0$ for the next frame group is queued for transmission. As a result the Drop Counter DC may be decremented to a value of 1.

Figure 4E:
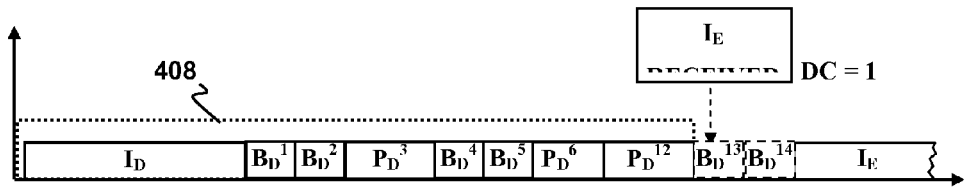

Since DC=1 only one P-frame is dropped from the transmission queue 408 for the next frame group. Again, it is desirable to evenly distribute the dropped frames across the frame group. For example, as shown in FIG. 4E, the transmission queue 408 may include I-frame $I_D^0$, P-frames $P_D^3$, $P_D^6$, $P_D^{12}$ and B-frames $B_D^1$, $B_D^2$ (which reference I-frame $I_D^0$ and P-frame $P_D^3$), $B_D^4$, $B_D^5$ (which reference P-frames $P_D^3$ and $P_D^6$), and $B_D^{13}$, $B_D^{14}$ (which reference P-frame $P_D^{12}$ and I-frame $I_E^0$ for the next frame group)). In this example, I-frame $I_E^0$ for the next frame group is queued for transmission before B-frames $B_D^{13}$, $B_D^{14}$ can be transmitted. Since all P-frames in the transmission queue 408 were transmitted, but not all the B-frames, the Drop Counter DC value does not change.

Figure 4F:
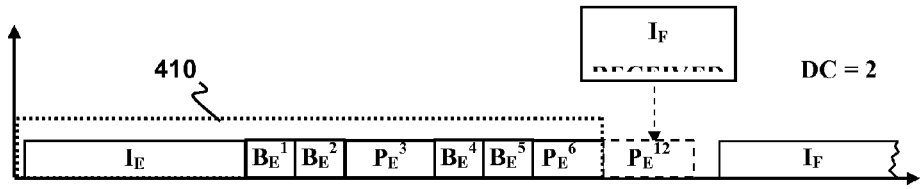

Since DC=1 only one P-frame is dropped from the transmission queue 410 for the next frame group. Again, it is desirable to evenly distribute the dropped frames across the frame group. For example, as shown in FIG. 4F, the transmission queue 410 may include I-frame $I_E^0$, P-frames $P_E^3$, $P_E^6$, $P_E^{12}$ and B-frames $B_E^1$, $B_E^2$ (which reference I-frame $I_E^0$ and P-frame $P_E^3$) and $B_E^4$, $B_E^5$ (which reference P-frames $P_E^3$ and $P_E^6$). B-frames that reference P-frame $P_D^{12}$ may be dropped from the transmission queue 410 since the corresponding B-frames were not transmitted in the previous transmission queue 408. In this example, I-frame $I_F^0$ for the next frame group is queued for transmission before P-frame $P_E^{12}$ can be transmitted. Since one P-frames in the transmission queue 410 was not transmitted, the Drop Counter DC value may be incremented, e.g., to DC=2.

Figure 4G:
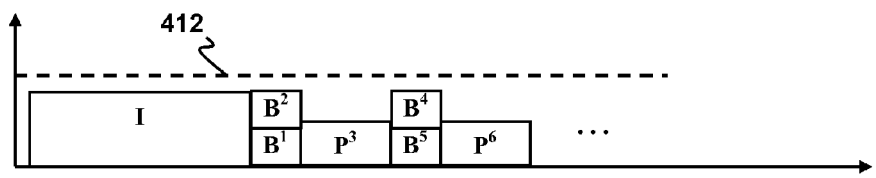

Various strategies for selecting the frames to predictively drop may be employed. By tuning the selection of frames to predictively drop, bandwidth usage may be maximized and streaming data quality may be optimized as well. Also, by "healing" up to the maximum number of sent frames, local temporary disturbances are dealt with, and the bandwidth utilization also kept near the maximum allowed. It is noted that many variations of predictive frame dropping as described above are possible. For example, instead of distributing the dropped frames across the frame group frames may be dropped in sequence starting from the beginning or the end of the frame group. In addition other predictive bandwidth adjustment techniques may be used in conjunction with or as alternatives to predictive frame dropping. For example, as shown in FIG. 4G, traffic shaping may be used in conjunction with frame dropping. Specifically, if a bandwidth limit 412 permits, B-frames $B^1$, $B^2$, $B^3$ and $B^4$ may be transmitted in parallel based on adjustments made to a transmission queue for a previous frame group while an I-frame I and P-frames $P^3$ and $P^6$ are not. Other frames may be predictively dropped as described above.

Figure 5:
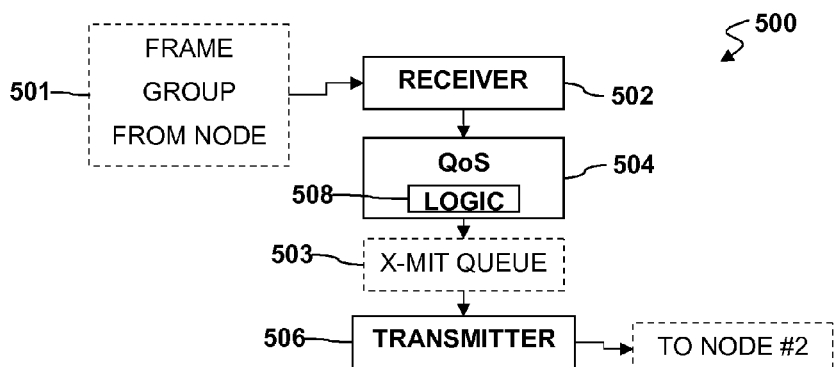
FIG. 5 is a block diagram of an apparatus for optimizing quality of streaming data transmitted over a network according to an embodiment of the present invention.

Embodiments of the present invention may be implemented in the form of an apparatus 500 for optimizing quality of streaming data transmitted over a network as shown in FIG. 5. The apparatus 500 may generally include a receiver module 502 a Quality of Service (QoS) module 504 and a transmitter 506. The receiver module may include logic adapted to receive one or more frame groups 501 from an upstream node. The QoS module 504 may include logic 508 adapted to generate a transmission queue 503 from the frame group 501. The transmitter 506 may be adapted to transmit the transmission queue 503 to a downstream node.

The logic 508 in the QoS module 504 may implement predictive frame dropping methods, e.g., as described above with respect to FIGS. 2A-2C, 3, and 4A-4G. The logic may be implemented in any suitable manner, e.g., in hardware, software, firmware or some combination of two or more of these. In particular, the logic 508 in the QoS module 504 may be adapted to drop from the transmission queue 503 frames that have not already be transmitted when a new I-frame is queued for transmission from the first node to the second node and/or predictively drop frames from subsequent transmission queues as described above. The logic 508 may also be adapted to determine the amount of bandwidth available to send the transmission queue 503 to the downstream node.

Figure 6:
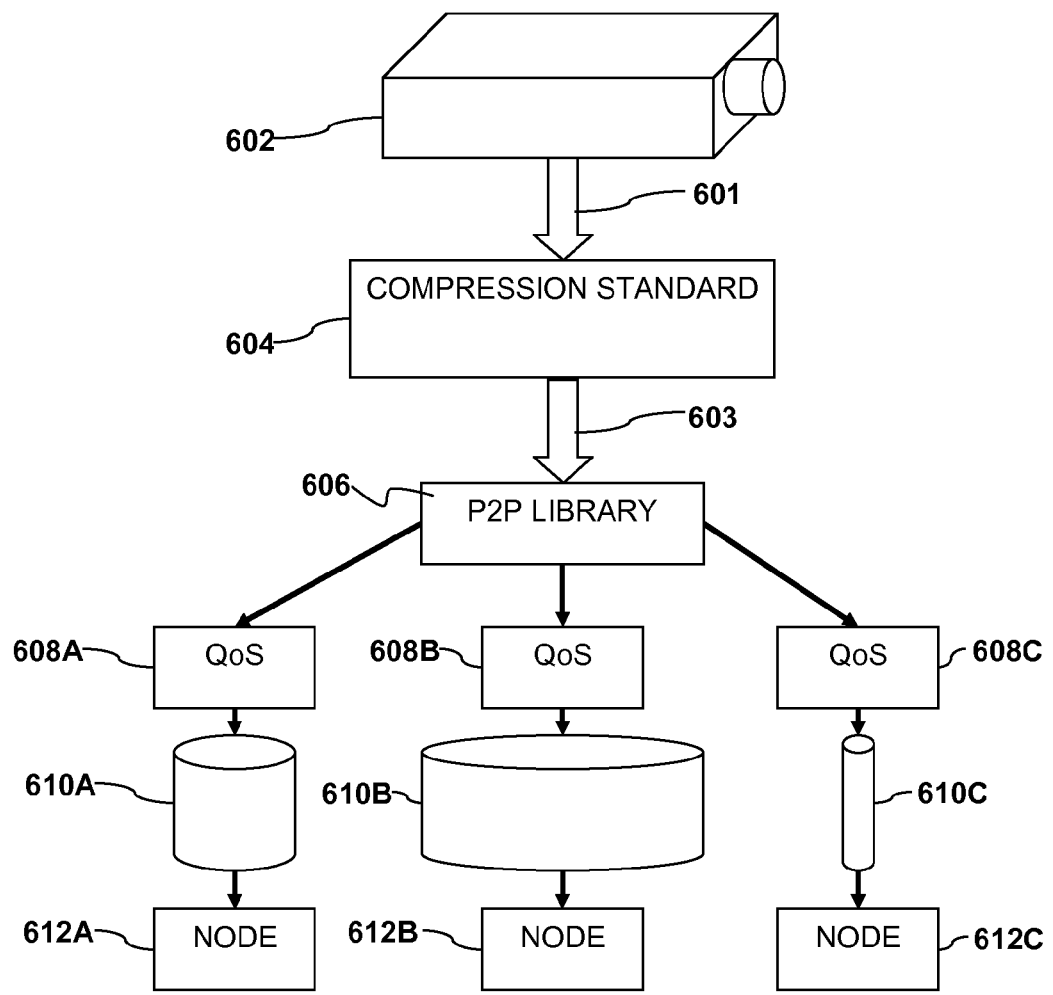
FIG. 6 is a schematic diagram of a network utilizing apparatus for optimizing quality of streaming data transmitted over a network according to an embodiment of the present invention.

Apparatus of the type depicted in FIG. 5 may facilitate transmission of streaming data over a network as shown in FIG. 6. Specifically, a streaming data signal 601 may be generated by a data generation module 602. The data generation module 602 may be any source of a signal from which streaming data may be generated. Specific examples of such modules include digital cameras, digital audio sources, software media players and decoders, digital media storage devices, and the like. In some embodiments, the signal 601 may be converted to streaming data 603 using a codec module 604 that operates according to a codec. By way of example if the streaming data signal 601 is a video signal, the codec may be a video compression standard such as MPEG layer 2, MPEG layer 4 simple profile, H.263 or H.264. The codec module 604 may be used as input to a client-server or peer-to-peer networking library 606 that distributes the compressed streaming data 603 to multiple QoS modules 608A, 608B, 608C which may be configured as described above with respect to FIG. 5. The QoS modules generate transmission queues from the compressed streaming data 603 for transmission over different network channels 610A, 610B, 610C to downstream 612A, 612B, 612C.

Each network channel may have a different bandwidth for network traffic. By way of example, each QoS module 608A, 608B, 608C may include logic adapted to drop from the transmission queues frames that have not already be transmitted when a new I-frame is queued for transmission from the first node to the second node and/or predictively drop frames from subsequent transmission queues. Such logic in the QoS modules 608A, 608B, 608C may be adapted to implement the methods described above. Each QoS module 608A, 608B, 608C may be adapted to determine an amount of bandwidth available to send the transmission queue over the network channels 610A, 610B, 610C respectively.

With embodiments of the present invention, bandwidth usage by a video stream may be maximized up to a QoS imposed limit. Furthermore, gaps in the video stream may be evenly distributed in time. By contrast, a naïve frame-dropping implementation that simply dropped frames the end of the GoP on a new I-frame or predictively dropped only from the beginning or end of a GoP might result in uneven "jerky" video. In addition, embodiments of the present invention can correctly deal with short term frame dropping due to CPU load, network congestion, or other factors that temporarily but anomalously lower the QoS bandwidth limit. Embodiments of the invention can also heal the video stream back to an optimal drop rate when the problem goes away. A further advantage of embodiments of the present invention is that all transmitted frames may be decodable at the receiving end if predictive or bi-predictive frames that depend on dropped frames are not sent. Using motion estimation, the receiver may also synthesize an estimate of the data that would have been sent in the unusable predictive frames, if the receiver has sufficient information.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for optimizing quality of streaming data transmitted between a first node and a second node over a network, wherein the first node includes a transmitter and one or more software modules embodied in a computer readable medium, wherein the one or more software modules include a Quality of Service (QoS) module, the streaming data including one or more frame groups, each frame group containing a plurality of frames, the method comprising:

sequentially transmitting a transmission queue containing one or more frames from a frame group from the first node to the second node using the transmitter;

with the QoS module, when a new frame group is queued for transmission, dropping from the transmission queue any frames in the transmission queue that have not already been transmitted;

with the QoS module, determining a number of frames that were dropped from the transmission queue;

for a subsequent frame group, predictively determining with the QoS module a number of frames of a given type to drop from a transmission queue for the subsequent frame group based on how many frames of the given type were dropped from the transmission queue for a frame group preceding the subsequent frame group; and dropping with the QoS module the predictively determined number of frames of the given type from the transmission queue for the subsequent frame group.

2. The method of claim 1, wherein each frame group includes one or more predictive frames (P-frames) that reference an Intra frame (I-frame), the method further comprising:

determining a number P of P-frames that were dropped from the transmission queue; and for a subsequent frame group dropping between 0 and P P-frames from a transmission queue for the subsequent frame group based on how many P-frames were dropped from the transmission queue for a frame group preceding the subsequent frame group.

3. The method of claim 2, wherein dropping between 0 and P P-frames from a transmission queue for the subsequent frame group includes selectively dropping one or more P-frames such that remaining P-frames in the subsequent frame group are substantially evenly spaced over the subsequent frame group.

4. The method of claim 2, wherein each frame group includes one or more bi-predictive frames (B-frames) that reference an immediately surrounding I-frame and/or P-frame, the method further comprising dropping from the transmission queue any B-frame that references a P-frame that was dropped from the transmission queue.

5. The method of claim 2 wherein dropping between 0 and P P-frames from a transmission queue for a subsequent frame group includes determining a drop count (DC) equal to the number of P-frames in the initial frame group that were dropped from the transmission queue for the initial frame group.

6. The method of claim 5 wherein dropping between 0 and P P-frames from a transmission queue for the subsequent frame group includes decrementing the drop count if all P-frames in a transmission queue for the frame group immediately preceding the subsequent frame group were transmitted.

7. The method of claim 5 wherein dropping between 0 and P P-frames from a transmission queue for the subsequent frame group includes incrementing the drop count if fewer than all P-frames in a transmission queue for the frame group immediately preceding the subsequent frame group were transmitted.

8. The method of claim 5 wherein dropping between 0 and P P-frames from a transmission queue includes dropping a number of frames equal to the drop count DC.

9. The method of claim 1 wherein sequentially transmitting a transmission queue containing one or more frames from the initial frame group from the first node to the second node includes traffic shaping one or more frames of the initial frame group.

10. The method of claim 1 wherein sequentially transmitting a transmission queue containing one or more frames from the initial frame group from the first node to the second node includes finishing transmission of a currently transmitting I-frame and subsequently transmitting a most recently received I-frame.

11. The method of claim 10, further comprising dropping from a transmission queue an intermediate I-frame received between the currently transmitting I-frame and the most recently received I-frame.

12. The method of claim 1 wherein the one or more frame groups include one or more groups of pictures (GoP) of a video stream and/or one or more frames of an audio stream and/or one or more frames of a game stream and/or one or more frames of a file transfer stream.

13. A Quality of Service apparatus, comprising:
an apparatus for optimizing quality of streaming data transmitted between a first node and a second node over a network, the streaming data including one or more frame groups, each frame group containing a plurality of frames, the apparatus comprising:
a QoS module containing logic adapted to generate a transmission queue from the frame groups, the logic being further adapted to, when a new frame group is queued for transmission, drop from the transmission queue any frames in the transmission queue that have not already be transmitted, and determine the number of frames that were dropped from the transmission queue;
wherein the logic is further adapted to, for a subsequent frame group, predictively determine a number of frames of a given type to drop from a transmission queue for the subsequent frame group based on how many of the given type were dropped from the transmission queue for a frame group preceding the subsequent frame group; and
drop the predictively determined number of frames of the given type from the transmission queue for the subsequent frame group.

14. The apparatus of claim 13, wherein the logic is adapted to:
determine a number P of predictive frames (P-frames) that were dropped from the transmission queue; and
for a subsequent frame group drop between 0 and P P-frames from a transmission queue for the subsequent frame group based on how many P-frames were dropped from the transmission queue for a frame group preceding the subsequent frame group.

15. The apparatus of claim 14, wherein the logic is adapted to selectively drop one or more P-frames such that remaining P-frames in the subsequent frame group are substantially evenly spaced.

16. The apparatus of claim 14, wherein the logic is adapted to drop from the transmission queue one or more bi-predictive frames (B-frames) that reference a P-frame that was dropped from the transmission queue.

17. The apparatus of claim 14 wherein the logic is adapted to determine a drop count (DC) equal to the number of P-frames in an initial frame group that were dropped from the transmission queue for the initial frame group.

18. The apparatus of claim 17 wherein the logic is adapted to decrement the drop count if all P-frames in a transmission queue for the frame group immediately preceding the subsequent frame group were transmitted.

19. The apparatus of claim 17 wherein the logic is adapted to increment the drop count if fewer than all P-frames in a transmission queue for the frame group immediately preceding the subsequent frame group were transmitted.

20. The apparatus of claim 17 wherein the logic is adapted to drop a number of frames equal to the drop count DC.

21. The apparatus of claim 13 wherein the logic is adapted to traffic shaping one or more frames of the initial frame group.

22. The apparatus of claim 13 wherein the logic is adapted to finish transmission of a currently transmitting intra frame (I-frame) and subsequently transmitting a most recently received I-frame.

23. The apparatus of claim 22 wherein the logic is adapted to drop from a transmission queue an intermediate I-frame received between the currently transmitting I-frame and the most recently received I-frame.

24. The apparatus of claim 13 further comprising a receiver module operably coupled to the QoS module, the receiver module being adapted to receive the frame group from an upstream node.

25. The apparatus of claim 13, further comprising a transmitter module operably coupled to the QoS module, the transmitter module being adapted to transmit the transmission queue from the first node to the second node.

26. A non-transitory processor-readable medium having embodied therein processor readably instructions for implementing a method for optimizing quality of streaming data transmitted between a first node and a second node over a network, the streaming data including one or more frame groups, each frame group containing a plurality of frames, the method comprising:
sequentially transmitting a transmission queue containing one or more frames from a frame group from the first node to the second node using the transmitter;
with the QoS module, when a new frame group is queued for transmission, dropping from the transmission queue any frames in the transmission queue that have not already been transmitted;
with the QoS module, determining a number of frames that were dropped from the transmission queue;
for a subsequent frame group, predictively determining with the QoS module a number of frames of a given type to drop from a transmission queue for the subsequent frame group based on how many frames of the given type were dropped from the transmission queue for a frame group preceding the subsequent frame group; and dropping with the QoS module the predictively determined number of frames of the given type from the transmission queue for the subsequent frame group.

* * * * *